United States Patent
Ilin

(10) Patent No.: US 10,723,968 B2
(45) Date of Patent: Jul. 28, 2020

(54) SLOW-BURNING LOG

(71) Applicant: Viktor Eduardovych Ilin, Kiev (UA)

(72) Inventor: Viktor Eduardovych Ilin, Kiev (UA)

( * ) Notice: Subject to any disclaimer, the term of this patent is extended or adjusted under 35 U.S.C. 154(b) by 0 days.

(21) Appl. No.: 15/757,367

(22) PCT Filed: May 10, 2016

(86) PCT No.: PCT/UA2016/000057
§ 371 (c)(1),
(2) Date: Mar. 4, 2018

(87) PCT Pub. No.: WO2017/135916
PCT Pub. Date: Aug. 10, 2017

(65) Prior Publication Data
US 2018/0245007 A1    Aug. 30, 2018

(30) Foreign Application Priority Data

Feb. 1, 2016    (UA) .................................. 201600730

(51) Int. Cl.
*C10L 11/06* (2006.01)
*B27M 1/08* (2006.01)
(Continued)

(52) U.S. Cl.
CPC ............. *C10L 11/06* (2013.01); *B27F 1/02* (2013.01); *B27M 1/08* (2013.01); *C10L 5/365* (2013.01);
(Continued)

(58) Field of Classification Search
CPC combination set(s) only.
See application file for complete search history.

(56) References Cited

U.S. PATENT DOCUMENTS

2012/0304533 A1* 12/2012 Paapsi .................... C10L 5/365
44/522

FOREIGN PATENT DOCUMENTS

JP    2002338978 A  * 11/2002
RU    2078795       5/1997

OTHER PUBLICATIONS

Bezopasnyi koster ili laifak dlya prigotovleniya edy. Dec. 13, 2013 [on-line] [retrieved on Sep. 27, 2016] Retrieved from the Internet:<URL: http://yourmood.ra/3804.html>.
(Continued)

*Primary Examiner* — Ellen M McAvoy
*Assistant Examiner* — Chantel L Graham
(74) *Attorney, Agent, or Firm* — Crose Law LLC; Bradley D. Crose

(57) ABSTRACT

A slow-burning log is made of a solid-fuel material of a vegetable origin, the log having upper, lower and side surfaces, upper and lower vertical incisions, which are made opened on the side surface, and which extend from the upper and lower surfaces respectively, towards the opposite surface without reaching it, wherein the lower vertical incisions are not coupled between each other and uniformly alternate with the upper vertical incisions, characterized in that the upper vertical incisions couple between each other inside the log body thereby forming a middle hole, in addition, the ends of the lower vertical incisions are higher than the ends of the upper vertical incisions, and the upper and lower vertical incisions are provided in an amount of not less than three respectively.

4 Claims, 4 Drawing Sheets

Figure 1:
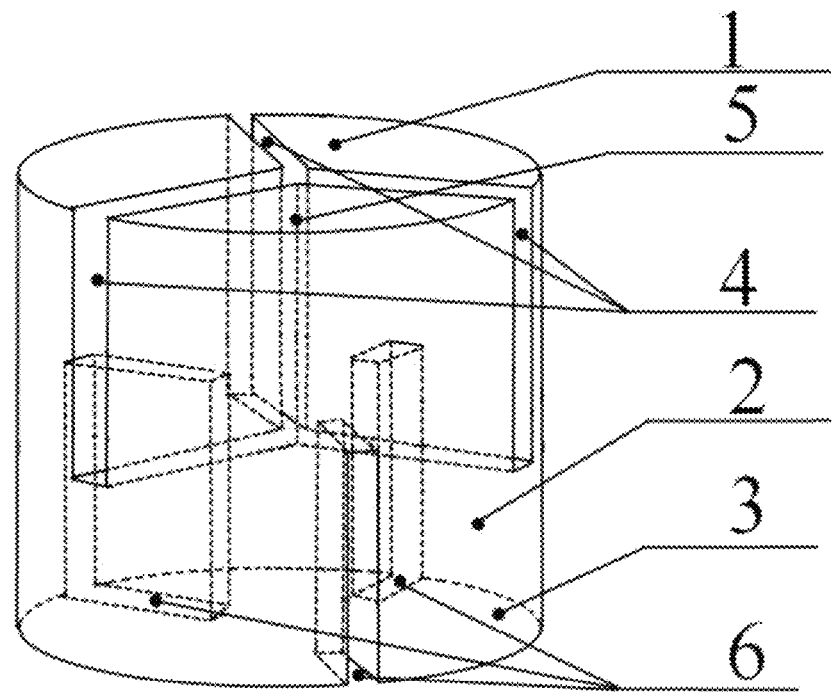

(51) Int. Cl.
*C10L 5/44* (2006.01)
*B27F 1/02* (2006.01)
*C10L 5/36* (2006.01)

(52) U.S. Cl.
CPC ................ *C10L 5/44* (2013.01); *C10L 5/442* (2013.01); *Y02E 50/10* (2013.01); *Y02E 50/30* (2013.01)

(56) References Cited

OTHER PUBLICATIONS

Nordic Log. Classical nordic yule log. [on-line] [retrieved on Sep. 28, 2016] Retrieved from the Internet url http://www.5starlogs.com/product/nordic-log>.

* cited by examiner

SLOW-BURNING LOG

The invention relates to lighting, heating or warming devices being a source of long-term stand-alone fire that may be utilized for heating, lighting or cooking at rest outdoors, in campings, in any field, touristic or other events.

A shaped fuel is known, the fuel comprising a chunk of wood or other organic inflammable material with axial cavity, an ignition cartridge with igniter cord disposed in the cavity and air channels connecting the axial cavity with outer surface of the chunk and which are made in the form of sector-forming vertical radial cuts not reaching chuck basis by at least half height thereof. And the axial cavity is arranged along the vertical axis of the chunk passing through any point of circle located on horizontal end plane of the chunk with the center lying on the vertical axis passing through center of gravity of the chunk and radius being equal to one third of maximum distance from center of this circle to the outer surface of the chunk that is provided with a mesh on the bottom of the axial cavity [see patent RU 2078795 (C1), IPC$^6$C10L11/06, C10L5/36, published on 10 May 1997].

Drawbacks of said technical solution in the embodiment of the device with diametrical upper and lower vertical recesses, which form a single longitudinal through axial hole (FIGS. 6, 7, 8 in the materials of the patent RU 2078795), lie in breakage of the device into parts during burning with incomplete combustion of these parts. Since after combustion of the upper section of the device, the lower section thereof is broken, since it is structurally divided into parts by lower diametrical recesses coupled between each other with a single longitudinal through axial hole, and after complete combustion of the upper section of the chunk, i.e. when the upper section is absent, the device will not be able to maintain integrity that leads to incomplete combustion of parts after breakage of the device and makes it impossible to further use the device as intended. Breakage of the device into parts with the corresponding loss of integrity, incomplete combustion thereof lead to reduction of usage time of the device and reduction of efficiency of usage thereof. At the same time, it is impossible to cook having a reservoir for cooking mounted on the upper surface of the chunk or on a support to be arranged on the upper surface of the chunk with consideration of breakage of the device into parts after combustion of the upper section.

Also, a drawback of the known device lies in accelerated combustion of the upper section thereof due to making upper vertical recesses as diametrical ones, i.e. rectilinear from one edge of the chunk to another one, since it leads to increase of intensity of gas exchange during burning, since such structural design of the upper vertical recesses causes formation of through rectilinear airflows inside the recesses that increases intensity of gas exchange and accelerates combustion.

A device is known from the existing prior art, the device being produced as a result of use of known method for processing wood for combustion, according to which, a wood material is transversely cut thereby producing a log having upper, lower and side surfaces, two upper and two lower diametrical vertical incisions, which are made opened on the side surface and extend from the upper and lower surfaces respectively towards the opposite surface without reaching it, wherein the upper diametrical vertical incisions uniformly alternate with the lower diametrical vertical incisions, and according to the invention, the log has a general through middle hole made along the entire height of the log, the upper section of which is formed by intersection of the upper diametrical vertical incisions, while the lower section is formed by intersection of the lower diametrical vertical incisions, besides, ends of the upper diametrical vertical incisions are arranged at a level of ends of the lower diametrical vertical incisions [see patent JP 2002338978(A), IPC$^7$C10L11/06, C10L5/44, B27M1/00, published on 27 Nov. 2002].

Drawbacks of said technical solution lie in breakage of the device into parts during burning with incomplete combustion of these parts. Since after combustion of the upper section of the device, its lower section is broken, the device is not able to maintain integrity, since the lower diametrical vertical incisions are coupled between each other dividing the device into separate independent parts.

Also, a drawback of the known device lies in rapid combustion of the upper section thereof due to making upper vertical incisions as diametrical, since it does not provide conditions for reduction of intensity of gas exchange during burning, since the upper vertical diametrical incisions, according to the structural design thereof, provide presence of the through rectilinear airflows inside the incisions that increases intensity of gas exchange and accelerates the burning process.

The closest analogue is a known Nordic log made of a natural timber, the log having upper, lower and side surfaces, three upper and three lower vertical incisions, which are made opened on the side surface and which extend from the upper and lower surfaces respectively towards the opposite surface without reaching it, wherein the upper and lower vertical incisions do not couple both as one with another one and as between each other, made separate and uniformly alternating, while ends of the upper vertical incisions are arranged at the level of ends of the lower vertical incisions [see the article «Nordic log». —[Electronic source]. —Access mode: http://www.5starlogs.com/product/nordic-log/].

A drawback of the known device lies in complexity of the ignition process thereof, since absence of a middle hole on the upper surface of the log causes ignition of each upper vertical incision separately or presence of an ignition device in each of said incisions that leads to inconvenience of usage of the log and complication of usage process.

Another drawback lies in high probability of complete fading out of the device in the process of burning and non-combustion, since making the upper vertical incisions as non-coupling between each other leads to absence of through airflows through the log body in the absence of wind or other artificial sources of airflows that significantly reduces the intensity of gas exchange in the process of burning and leads to fading out in case of insufficient air volume, which could maintain stable provision with oxygen and stable burning of the device. At the same time, for guaranteed ignition, the upper vertical incisions should be soaked with a highly flammable substance that requires performing additional operations and using additional materials when embodying the device or when using thereof that reduces manufacturability, increases labor intensity, material intensity and value of the device.

Furthermore, according to the structural concept, ends of the upper vertical incisions are arranged at the level of ends of lower vertical incisions that causes non-uniform ignition of the lower section or fading out of the device, since after combustion of the upper section of the log, flame is not distributed to the walls of the lower vertical incisions thereby making their ignition impossible and, thus, uniform ignition and complete combustion of the lower section and, therefore, complete combustion of the device. Usually, for complete combustion of the lower section it is required to additionally soak the lower vertical incisions with a highly flammable substance or to additionally ignite each incision separately that requires performing additional operations and using additional materials when embodying the device or during usage thereof, that reduces manufacturability, increases labor intensity, material intensity and value of the device.

A technical problem to be solved by the proposed invention lies in how to provide a novel, effective, technological device having improved characteristics serving as a source of stand-alone environmentally-friendly fire providing effective, uniform and long-term burning.

The problem is solved due to the fact that in the slow-burning log made of a solid-fuel material of a vegetable origin, the log having upper, lower and side surfaces, upper and lower vertical incisions, which are made opened on the side surface, and which extend from the upper and lower surfaces respectively towards the opposite surface without reaching it, wherein the lower vertical incisions are not coupled between each other and uniformly alternate with the upper vertical incisions, according to the invention, the upper vertical incisions couple between each other inside the log body thereby forming a middle hole, in addition, the ends of the lower vertical incisions are higher than the ends of the upper vertical incisions, and the upper and lower vertical incisions are provided in an amount of not less than three respectively.

Also according to the invention, upper and lower vertical incisions are made non-paired.

Also according to the invention, the slow-burning log may comprise an ignition agent mounted at least in the middle hole and/or the middle hole may be soaked with a highly flammable substance.

Also according to the invention, the proposed device may have a handle for convenient transportation thereof, the handle being fixed on the upper surface or on the lower surface, or on the side surface of the log.

Also according to the invention, the log may have a removable support for a reservoir for cooking and/or for mounting the log at a distance from a solid surface.

The proposed device is made of a solid-fuel material of a vegetable origin, preferably of a natural dry timber, and it may have a form of a sawed-off tree trunk portion—a log, preferably of birch, mounted vertically.

Technical effect that is achieved when solving the technical problem lies in provision of uniform moderate burning when using the log, complete combustion thereof, maintaining integrity of the device during burning with elimination of breakage into parts, effective uniform ignition of the log section that comprises lower vertical incisions with further uniform moderate burning until complete combustion of the device with elimination of fading out and provision of burning stability and slow burning of the device. At the same time, increase of the burning duration of the claimed log is provided. Therewith, increase of manufacturability, usage convenience, reduction of material intensity and value is provided.

Cause-and-effect relationship between essential features of the proposed solution and technical effect lies in the following.

In the claimed slow-burning log made of a solid-fuel material of a vegetable origin, the upper and lower vertical incisions extend from the upper and lower surfaces respectively towards the opposite surface without reaching it, wherein the lower vertical incisions uniformly alternate with the upper vertical incisions, the lower vertical incisions, which are opened on the side surface, are made separate from each other, while the upper vertical incisions, which are opened on the side surface, couple with each other thereby forming a middle hole, and in addition, the lower vertical incisions terminate in the log body higher than the upper vertical incisions terminate, and in the corresponding manner conversely, i.e. upper and lower vertical incisions terminate in the log body intersecting the same area (section) of the log.

The upper vertical incisions, when coupling between each other, form the middle hole that, in turn, creates favorable conditions for rapid ignition of the log. Since the middle hole represents a part of the upper vertical incisions, after ignition of the middle hole, e.g., soaked with a highly flammable substance, or an ignition agent that is usually arranged in the middle hole, the flame is distributed to inner walls of the upper vertical incisions thereby making the ignition process of the log more convenient for user of the device and such that requires less time, in contrast to the closest analogue, while the ignition process (flame distribution) becomes uniform thereby providing stable moderate burning.

Due to the fact that in the slow-burning log the ends of the lower vertical incisions are arranged above the ends of the upper vertical incisions, ignition of the lower section of the log and impossibility of fading out thereof is provided, since during burning of the upper section of the log the flame is gradually distributed to the lower section of the log, since in the process of after-burning of the upper section of the log the burning zone gradually distributes to inner walls of the lower vertical incisions due to presence of a general area simultaneously provided by ends of the upper and lower vertical incisions, wherein such ignition of the lower vertical incisions creates conditions for their ignition, uniform stable moderate burning and, thus, complete moderate combustion of the log. At the same time, fading out of the device after combustion of that section of the log that is provided with the upper vertical incisions is eliminated, as well as breakage of the device into parts and complete combustion of the log from top to bottom is eliminated.

Change of the direction of through airflows inside the log body that slows down the burning process and increases usage time of the device is provided due to non-pair number and structural details of the upper vertical incisions, which are made coupled between each other inside the log body thereby forming the middle hole. Such structure provides division of the airflows that leads to slowing down of movement speed of the airflows, air, e.g. in the embodiment of the device with three upper vertical incisions, is delivered to the upper vertical incisions from the side surface, and then it is divided into two flows. In turn, it reduces intensity of gas exchange and slows down the burning process of the log, in contrast to the analogues, which either have through rectilinear airflows that leads to increase of the burning intensity and reduction of the burning duration, or there are no through airflows at all, as in case of the closest analogue, that, in turn, leads to fading out of the device.

At the same time, the set of essential features following from the above provides increase of the burning term of the claimed log.

Therewith, a number of operations when embodying and using the device is reduced, as well as a need in additional soaking of each incision with a highly flammable substance is eliminated that provides increase of manufacturability, usage convenience, reduction of material intensity and value.

Figure 2:
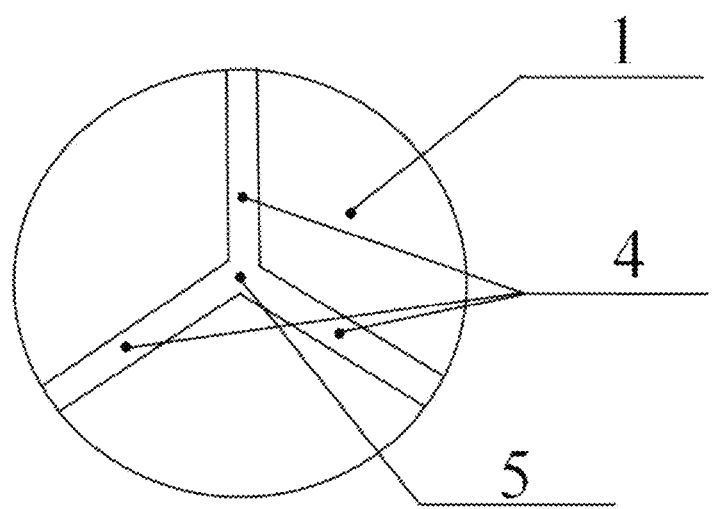
Figure 3:
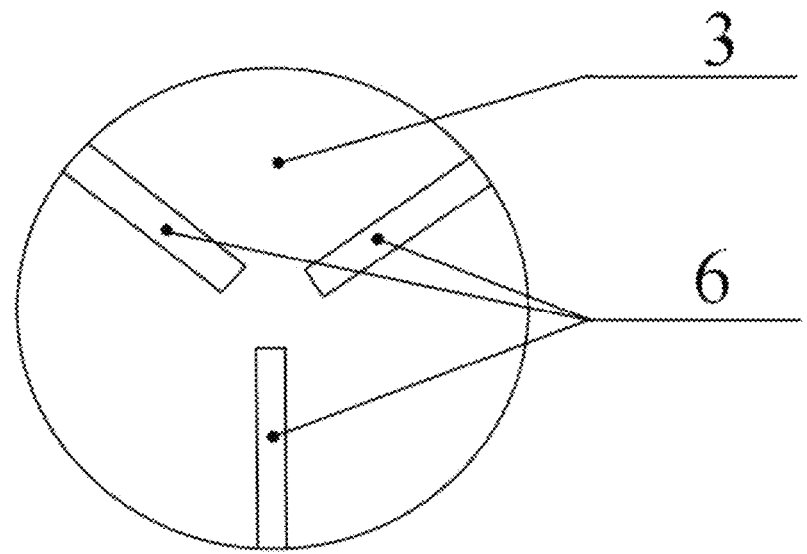
Figure 4:
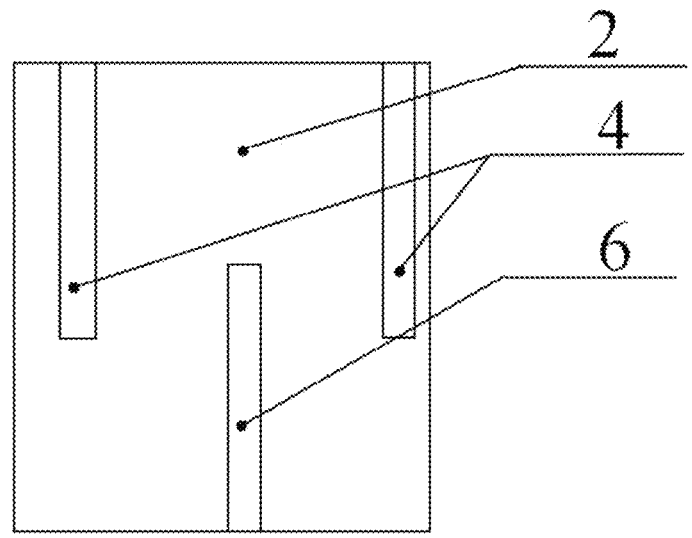
Figure 5:
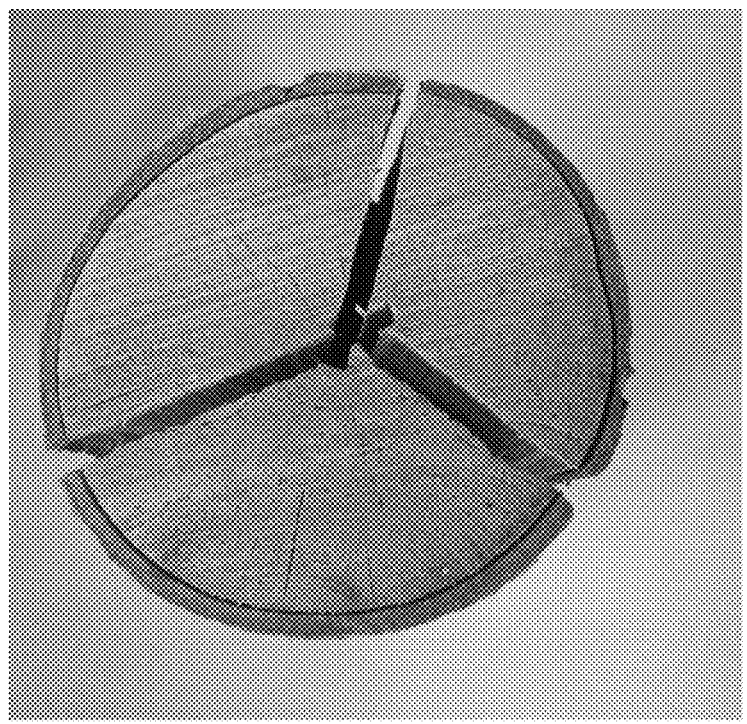
Figure 6:
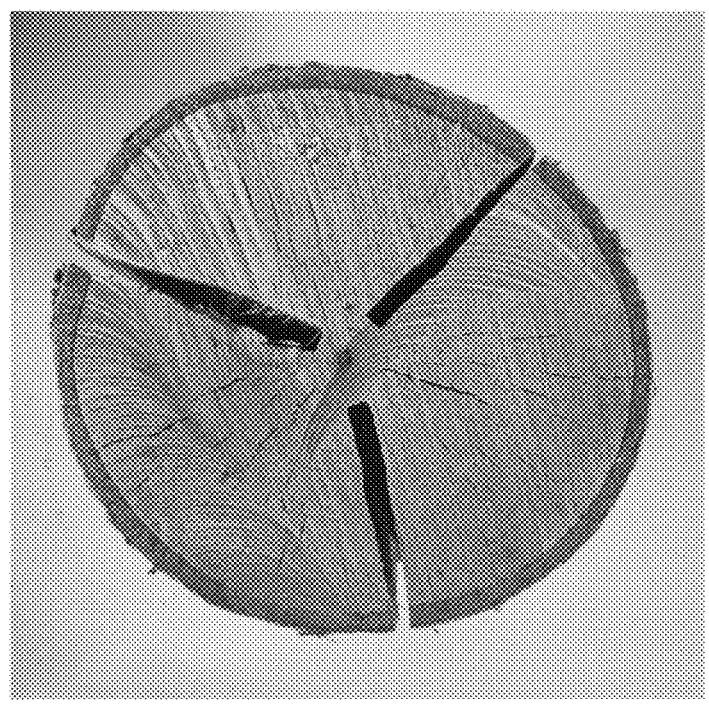
Figure 7:
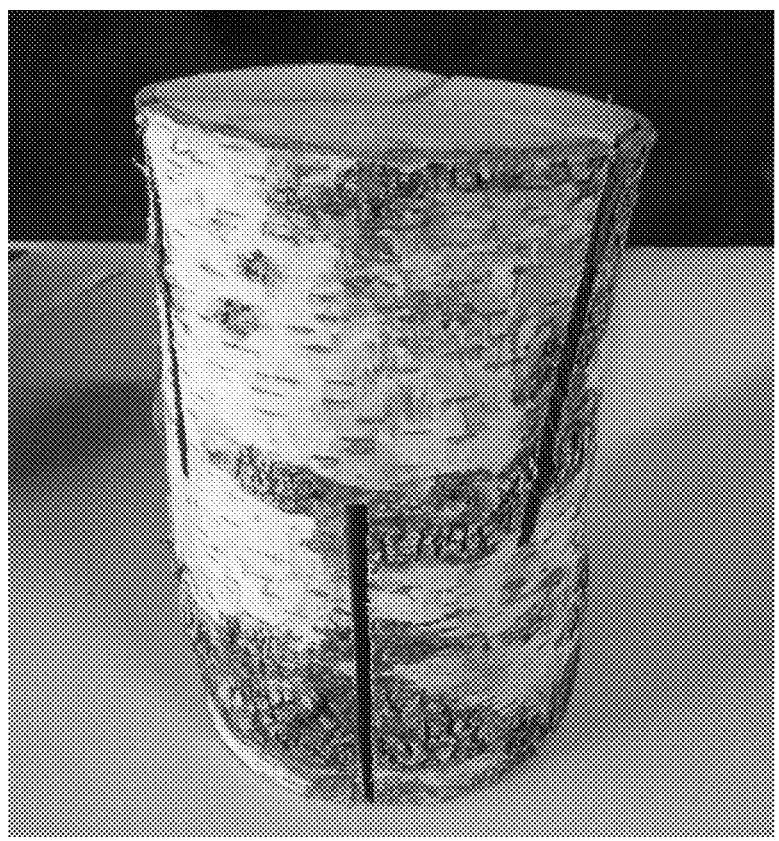

The essence of the claimed invention is explained by illustrations, which present:

FIG. 1—an overall view of the slow-burning log;
FIG. 2—a top view of the slow-burning log;
FIG. 3—a bottom view of the slow-burning log;
FIG. 4—a fragment of a side view of the slow-burning log;
FIGS. 5, 6, 7—examples of embodiments of the slow-burning log:
FIG. 5—an overall top view,
FIG. 6—an overall bottom view,
FIG. 7—a fragment of the overall side view.

The proposed slow-burning log comprises: upper surface 1; side surface 2; lower surface 3; upper vertical incisions 4, which are coupled between each other thereby forming a middle hole 5, and lower vertical incisions 6.

The upper vertical incisions 4 extend from the upper surface 1 towards the lower surface 3 without reaching it. The upper vertical incisions 4, which are made opened on the side surface 2, when penetrating inside the log body and coupling between each other in the central section of the log, form the middle hole 5 that begins in the midsection of the upper surface 1 and penetrates into the log body towards the lower surface 3.

The lower vertical incisions 6 are made such that they extend from the lower surface 3 towards the upper surface 1 without reaching it and such that they do not couple and are separated from each other by the log body.

At the same time, the upper vertical incisions 4 do not couple with the lower vertical incisions 6 and uniformly distribute with them.

If the log has a regular round shape or a shape close thereto along the perimeter, the central longitudinal axis of the upper middle hole 5 may coincide with the central longitudinal axis of the log. In the embodiment of the log with three or five upper vertical incisions 4 and three or five lower vertical incisions 6 respectively, or more in the non-pair number, they are arranged approximately at equal angles and distributed uniformly along the perimeter of the log surface, wherein the lower ones alternate with the upper ones.

The claimed slow-burning log may be made with a handle for convenient transportation thereof, the handle may be arranged on the upper surface 1 or on the lower surface 3, or on the side surface 2.

Furthermore, for the sake of rapid ignition the slow-burning log may have an ignition agent mounted in the middle hole 5 and/or the middle hole may be soaked with a highly flammable substance.

In separate case, e.g., in case of need in increase of burning intensity, walls of the upper vertical incisions 4 and lower vertical incisions 6 may be soaked with a highly flammable substance.

The proposed slow-burning log is preferably used in any touristic events and in campings, as well as in fireplaces and bonfires as a source of long-term stand-alone fire for warming, cooking or as a source of light, in the following way.

The slow-burning log is arranged by the lower surface 3 on a surface being suitable for arrangement of the burning device thereon or on a support that is arranged on the selected surface. The ignition agent arranged in the middle hole 5 or a wick of this agent extending therefrom is scorched. Afterwards, gradual uniform slow inflammation of the upper section of the slow-burning log occurs.

Air is delivered through the upper incisions 4 from the side surface 2 and upper surface 1 to the burning zone, while the air cools walls of the upper vertical incisions 4 and the side surface 2 directly thereby enabling maintenance of stable slowed down burning process.

Flame distribution front on the side surface 2 and inside the upper through incisions 4 and lower through incisions 6 uniformly and slowly moves from top to bottom until the complete combustion of the log occurs. In the course of after-burning of the upper section of the log, the flame is gradually distributed to the lower vertical incisions 6 that provides ignition of the lower section of the log and complete combustion thereof.

After the slow-burning log is ignited, a reservoir suitable for cooking and/or warming water or a support for arranging the reservoir for cooking is arranged on the upper surface 1, if necessary. The support for arranging the reservoir for cooking is used for arranging the reservoir for cooking at a distance from the upper surface 1 and/or more reliable holding of the reservoir for cooking.

Also, together with the slow-burning log a support for its arrangement at a distance from a surface may be used, the support, e.g., provides vertical position of the log in the case, when the surface is irregular.

Preferably, the slow-burning log is made from timber, i.e. from a tree section coated with a bark. Various wood species are used, preferably, birch.

It has been experimentally established that making upper and lower vertical incisions, according to the claimed structural solution being proposed, enables absolute combustion of the slow-burning log, non-breakage thereof into parts during burning and increase of convenience and efficiency of the device ignition.

Upon comparison of the proposed technical solution with the analogues known from the prior art, it is concluded that the slow-burning log meets the criterion of "inventive step", since it is presented with qualitative structural changes of making the incisions thereby producing an improved uniformly distributed ventilation system with associated structurally effectively functioning airflows for supplying air to the burning zone and also providing achievement of said technical effect being not established in the existing prior art earlier.

Structures of the slow-burning log having the claimed set of essential features have not been revealed from existing sources of patent and scientific and technical information, thus, the presented technical solution meets the criterion of "novelty".

Also according to the results of experimental practice examination, the proposed solution is suitable for industrial use, since it does not contain any structural elements or materials, which could not be reproduced at the actual science and engineering development stage using the data disclosed in the description, therefore, the present technical solution is considered to be compliant with the criterion of "industrial applicability".

The invention claimed is:

1. A slow-burning log made of a solid-fuel material of a wood origin, the log having upper, lower and side surfaces, upper and lower vertical incisions, which are made opened on the side surface, and which extend from the upper and lower surfaces respectively, towards the opposite surface without reaching it, wherein the lower vertical incisions are not coupled between each other and uniformly alternate with the upper vertical incisions, characterized in that the upper vertical incisions couple between each other inside the log body thereby forming a middle hole, in addition, the ends of the lower vertical incisions are higher than the ends of the upper vertical incisions, and the upper and lower vertical incisions are made non-paired and in an amount of not less than three respectively.

2. The slow-burning log according to claim 1, characterized in that it comprises an ignition agent arranged at least in the upper middle hole and/or the middle hole is soaked with a highly flammable substance.

3. The slow-burning log according to claim 1, characterized in that it is made with a handle.

4. The slow-burning log according to claim 1, characterized in that it is made with a removable support for a reservoir for cooking and/or for mounting the log at a distance from a solid surface.

\* \* \* \* \*